United States Patent Office 3,408,357
Patented Oct. 29, 1968

3,408,357
ALKYL ACID ESTERS OF 4-ALKYLOXY-N-SUBSTITUTED-4-PIPERIDINOLS
Hans Herbert Kühnis, Hugo Ryf, and Rolf Denss, Basel, Switzerland, assignors to Geigy Chemical Corporation, Greenburgh, N.Y., a corporation of Delaware
No Drawing. Continuation-in-part of application Ser. No. 382,955, July 15, 1964. This application Jan. 12, 1966, Ser. No. 520,093
Claims priority, application Switzerland, July 19, 1963, 9,052/63
7 Claims. (Cl. 260—294.3)

This application is a continuation-in-part of our pending patent application Ser. No. 382,955 filed July 15, 1964.

The present invention concerns, in a first aspect, aliphatic and aromatic-aliphatic ketones having valuable pharmacological properties.

It has surprisingly been found that ketones of the formula

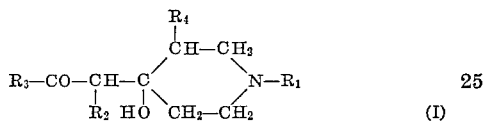

(I)

wherein $R_1$ represents hydrogen, an alkyl radical having at most 12 carbon atoms, an alkenyl radical having 3 to 5 carbon atoms, the cyclopropylmethyl radical or a phenylalkyl radical having 7 to 9 carbon atoms, $R_2$ represents hydrogen or the methyl radical, and $R_3$ represents an alkyl radical having at most 4 carbon atoms, the phenyl radical, a phenylalkyl radical having 7 to 9 carbon atoms, the styryl radical, or together with $R_2$, it represents an optionally methyl-substituted trimethylene to hexamethylene radical, preferably trimethylene, tetramethylene and 1-methyl-tetramethylene, and $R_4$ represents hydrogen, or the methyl radical and their pharmaceutically acceptacle salts with inorganic and organic acids, have valuable pharmacological properties, in particular an excellent analgesic activity on both oral and parenteral application, and strong antitussive activity. In contrast to other known analgesics, they have no para-sympatholytic properties, but especially those in which $R_3$ is alkyl, have a mild para-sympathomimetic action. At the same time, they have only relatively slight toxicity and are suitable, therefore, for the relief and removal of pain of various origin and also of tussive irritation.

In the compounds of the Formula I and in the starting materials used therefor which are mentioned below, $R_1$ is, for example, hydrogen, alkyl radicals such as the methyl, ethyl, n-propyl, isopropyl, n-butyl, iso-butyl, sec. butyl, n-amyl, isoamyl, n-hexyl, n-octyl, n-decyl or n-dodecyl radical; alkenyl radicals such as the allyl, crotyl, methallyl or γ,γ-dimethallyl radical; the cyclopropylmethyl radical or phenylalkyl radicals such as the benzyl, β-phenylethyl or γ-phenylpropyl radical.

$R_3$, by itself, is, for example, the methyl, ethyl, n-propyl, isopropyl, n-butyl, isobutyl, sec. butyl, tert. butyl, phenyl, benzyl, α-methylbenzyl, α-phenylethyl, β-phenylethyl or styryl radical (β-phenylvinyl radical).

Also, $R_3$, together with $R_2$, form, for example, the trimethylene, tetramethylene, 1 - methyltetramethylene, pentamethylene or hexamethylene radical.

Especially the compounds of the formula

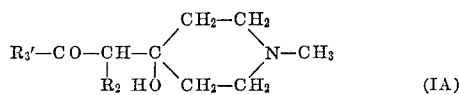

(IA)

wherein $R_2$ has the same meaning as in Formula I, and $R_3'$ is alkyl of from 1 to 4 carbon atoms, have strong antitussive activity while their lack of, or weak response to the tail-flick test on mice indicates that they are substantially non-habit forming [Archer et al., J. Medic. Chem. 7, 123 (1964)].

Moreover, these compounds show good response in the phenylquinone writhing test on rats. These compounds are, therefore, indicated for use as antitussive and mild analgesic agents.

The present invention concerns particularly new esters of hydroxy ketones which have valuable pharmacological properties.

It has surprisingly been found that these new compounds of the general formula

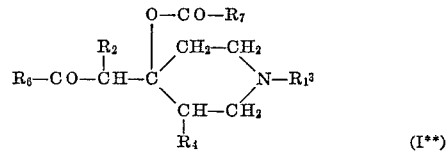

(I**)

wherein $R_1^3$ represents an alkyl radical having at most 12 carbon atoms, an alkenyl radical having 3 to 4 carbon atoms, the cyclopropylmethyl radical or a phenylalkyl radical having 7 to 9 carbon atoms, $R_2$ represents hydrogen or the methyl radical, $R_4$ represents hydrogen or the methyl radical, $R_6$ represents an alkyl radical having at most 4 carbon atoms or, together with $R_2$, it represents an optionally methyl - substituted trimethylene to hexamethylene radical, especially trimethylene, tetramethylene or 1-methyl-tetramethylene, and $R_7$—CO— represents an alkanoyl radical having at most 5, preferably 2 to 3 carbon atoms, and their salts with inorganic and organic acids, have substantially the same utility as the compounds of Formula I.

Especially good antitussive and mild analgesic agents according to this aspect of the invention are those of Formula I** in which $R_1$ is methyl, the properties of which correspond in general to those of the compounds of Formula IA.

In the compounds of Formula I** and in the starting materials used therefor which are mentioned below, $R_1$ is, for example, alkyl radicals such as the methyl, ethyl, n-propyl, isopropyl, n-butyl, isobutyl, sec. butyl, n-amyl, isoamyl, n-hexyl, n-octyl, n-decyl or n-dodecyl radical; alkenyl radicals such as the allyl, crotyl or methallyl radical; the cyclopropylmethyl radical or also phenylalkyl radicals such as the benzyl, β-phenylethyl or γ-phenylpropyl radical.

$R_6$ by itself is, for example, the methyl, ethyl, n-propyl, isopropyl, n-butyl or tert. butyl radical.

Also, together with $R_2$, $R_6$ forms, for example, a trimethylene, 1-methyl-tetramethylene, pentamethylene or hexamethylene radical.

The low alkanoyl radical $R_7$—CO— is, for example, the acyl radical of acetic acid, propionic acid, butyric acid, isobutyric acid, valeric acid or isovaleric acid.

The compounds of general Formula I** are produced by reacting a hydroxy compound of general formula

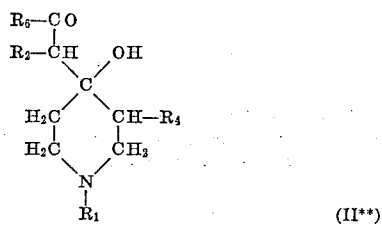

(II**)

wherein $R_1$, $R_2$, $R_6$ and $R_4$ have the meanings given above, with a low alkanoic acid, with a reactive functional derivative thereof or with a corresponding ketene. For example, a hydroxy compound embraced by the above formula is treated with a halide, cyanide or anhydride of a low alkanoic acid.

The acylating agents are used without solvent or in inert organic solvents such as, e.g. diethyl ether, tetrahydrofuran or benzene.

An acid binding agent, e.g. a tertiary organic base such as pyridine or triethylamine can be added if desired but it is not necessary to attain a complete reaction.

Low reaction temperatures of at most about 60°, preferably however, of about 0° to room temperature, are important for the success of the reaction according to the invention as the starting materials of general Formula II** are tertiary hydroxy compounds which, when reacted with acylating agents at higher temperatures, easily split off water.

The starting materials of the general Formula II** can be produced in various ways. For example, they can be produced in a surprisingly simple manner by reacting a compound of the general formula

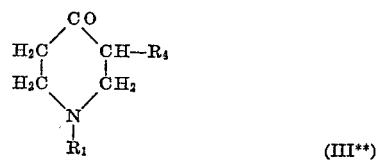

(III**)

with a ketone of the general formula $$R_6\text{—CO—CH}_2\text{—}R_2 \qquad (IV^{**})$$

wherein $R_1$, $R_2$, $R_6$ and $R_4$ have the meanings given in general Formula I** the reaction being performed in the presence of a basic or acid substance present in homogeneous or heterogeneous phase.

Inorganic bases such as sodium hydroxide and organic bases such as piperidine, piperazine and, in anhydrous medium or in the absence of solvents, also alkali metal alcoholates can be used, on the one hand, as basic condensing agents and, on the other, basic ion exchangers, preferably those containing quaternary ammonium groups such as, e.g. Amberlite IRA 400 (OH⊖) and also more weakly basic ion exchangers such as Amberlite IR 4B can be used, which condensing agents can be added in portions or also continuously. Depending on the solubility of the starting materials, for example water, an aqueous and also an anhydrous low alkanol can serve as reaction medium.

Exmples of acid condensing agents are ammonium salts such as, e.g. ammonium acetate, alone or combined with glacial acetic acid and, optionally, with an inert solvent such as, e.g. benzene, also acid ion exchangers such as, e.g. Amberlite IR 120 (H⊕) form in water or in an aqueous low alkanol as reaction medium.

The condensations are preferably performed at room temperature to moderately raised temperature, i.e. the preferred temperature range lies between about 20 and 60° C. At higher temperatures, e.g. at the boiling temperature of the solvent or diluent used, generally water is split off after the hydroxy compound has been formed so that the corresponding compound having a cyclic double bond is formed as main product. Naturally, whether water is split off depends not only on the reaction temperature but also on the type of starting materials, the condensing agent and the solvent and also on the concentration and duration of reaction so that the upper temperature limit mentioned of 60° C. for the obtention of hydroxy compounds of general Formula I should only be regarded as a guiding principle.

The compounds of general Formula III are 4-piperidones and 3-methyl-4-piperidones optionally substituted as defined in the 1-position. Compounds of this general formula are already known and others can be produced in an analogous manner. Suitable ketones of the general Formula IV are, for example, methylalkyl ketones the alkyl group of which has a straight or branched chain such as, e.g. acetone, butanone, methyl-n-propyl ketone, methyl-isopropyl ketone, methyl-n-butyl ketone, methyl-isobutyl ketone, methyl-sec. butyl ketone and pinacolin, on the use of which compounds are formed having a hydrogen atom as $R_2$; also diethyl ketone and ethyl-sec. alkyl ketones such as ethylisopropyl ketone which yield compounds of general Formula I** having a methyl group as $R_2$; as well as cycloalkanones such as cyclopentanone, cyclohexanone, cycloheptanone and cyclooctanone.

Another process suitable for the production of starting materials of the general Formula II wherein the radical $R_6$ is bound to the carbonyl group by way of a methylene group, consists in treating, at room temperature to moderately raised temperature, a compound of general Formula V

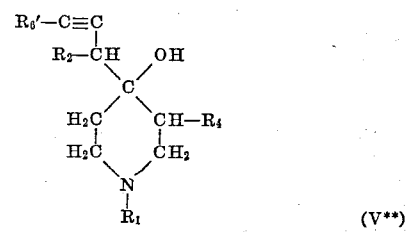

(V**)

wherein $R_6'$ represents $R_6$ or hydrogen, and $R_1$, $R_2$ and $R_4$ have the meanings given in Formula I**, with an aqueous mineral acid containing mercury ions. 10–84% sulphuric acid, for example, is a suitable mineral acid. The higher the acid concentration, the lower is the reaction temperature chosen; on using 84% sulphuric acid the reaction is preferably performed at room temperature, with 10% sulphuric acid it is preferably performed at 50–60°.

A few compounds of general Formula V containing hydrogen as $R_2$ and $R_6'$ are described in French Patent 665 M. Others can also be produced as therein described, i.e. by reacting propargyl bromide with amalgamated magnesium, zinc or aluminum in a mixture of tetrahydrofuran and toluene and condensing the metal organic compound formed with a 4-piperidone substituted corresponding to the definition of $R_1$ and $R_4$. Also analogous compounds can be used instead of propargyl bromide which yield starting materials of the general Formula V containing (a) radical(s) $R_2$ and/or $R_6'$ different from hydrogen. The process described in the above French patent is advantageously modified in that, instead of coarse aluminum turnings amalgamated simply with mercury chloride, one is used which is first amalgamated with metallic mercury and then treated with mercury chloride.

The compounds of general Formula I** form salts, some of which have good water solubility, with inorganic and organic acids such as hydrochloric acid, hydrobromic acid, sulphuric acid, nitric acid, phosphorus acid, methane sulphonic acid, ethane disulphonic acid, β-hydroxyethane sulphonic acid, acetic acid, propionic acid, maleic acid, fumaric acid, lactic acid, malic acid, tartaric acid, citric acid, benzoic acid, salicylic acid, phenylacetic acid and mandelic acid.

The following examples illustrate the performance of the process according to the invention but are by no means the only ways of performing same. The temperatures are given in degrees centigrade.

Example 1

(a) 67.8 g. of 1-methyl-4-piperidone are added dropwise within 5 hours while stirring well to a mixture of 120 g. of Amberlite IRA 400 (OH$^\ominus$), which has been washed neutral and previously stirred for 15 hours with 2N sodium hydroxide solution at room temperature, and 176 g. of acetone, and then the mixture is stirred for another 19 hours. The ion exchanger is then filtered off and washed with methanol and the filtrate is evaporated in a rotary evaporator in vacuo. The crude product is distilled under high vacuum whereupon 1-(1'-methyl-4'-hydroxy - 4' - piperidyl) - 2 - propanone is obtained, (B.P.$_{0.01}$75°).

The above base is dissolved in acetone and a saturated solution of citric acid in acetone is added while stirring until the solution has an acid reaction (pH 4). The salt which precipitates is filtered off and recrystallised from acetone/methanol. The citrate of 1-(1'-methyl-4'-hydroxy-4'-piperidyl)-2-propanone melts at 103–105°.

The following compounds are produced in an analogous manner:

1-(1'-methyl-4'-hydroxy-4'-piperidyl)-2-butanone, B.P.$_{0.01}$ 95°, citrate M.P. 145–146°;
1-(1'-methyl-4'-hydroxy-4'-piperidyl)-2-pentanone, B.P.$_{0.003}$ 119–121°, citrate M.P. 126–128°;
1-(1'-methyl-4'-hydroxy-4'-piperidyl)-2-hexanone, B.P.$_{0.01}$ 116–118°;
1-(1'-methyl-4'-hydroxy-4'-piperidyl)-3-methyl-2-butanone, B.P.$_{0.005}$ 85°, citrate M.P. 132–134°;
2-(1'-methyl-4'-hydroxy-4'-piperidyl)-cyclohexanone, B.P.$_{0.01}$ 125°, M.P. 95–96°;
2-(1'-methyl-4'-hydroxy-4'-piperidyl)cyclopentanone, B.P.$_{0.003}$ 115–118°, M.P. 70°, citrate M.P. 157–158°;
2-(1'-methyl-4'-hydroxy-4'-piperidyl)-6-methyl-cyclohexanone, B.P.$_{0.002}$ 119–129°, M.P. 125–126°;
2-(1'-methyl-4'-hydroxy-4'-piperidyl)-3-pentanone, B.P.$_{0.008}$ 95–100°, citrate 130–132°;
1-(1',3'-dimethyl-4'-hydroxy-4'-piperidyl)-2-propanone, citrate M.P. 120°.

(b) 17.1 g. of 1-(1'-methyl-4'-hydroxy-4'-piperidyl)-2-propanone are first cooled to 0° while stirring, then 10.2 g. of acetanhydride are added, the ice cooling is removed and the mixture is stirred for another 15 minutes. 200 ml. of acetone are then added while cooling with ice. On adding a saturated citric acid solution in acetone until the reaction is acid, the citrate of 1-(1'-methyl-4'-acetoxy-4'-piperidyl)-2-propanone precipitates without further cooling. It is filtered off and recrystallised from acetone/methanol. M.P. 153°.

The following compounds are produced in an analogous manner:

1-(1'-methyl-4'-acetoxy-4'-piperidyl)-2-butanone, citrate M.P. 139°;
1-(1'-methyl-4'-acetoxy-4'-piperidyl)-2-pentanone, citrate M.P. 164°;
1-(1'-methyl-4'-acetoxy-4'-piperidyl)-2-hexanone;
1-(1'-methyl-4'-acetoxy-4'-piperidyl)-3-methyl-2-butanone, citrate M.P. 157°;
2-(1'-methyl-4'-acetoxy-4'-piperidyl)-cyclohexanone, citrate M.P. 162–163°;
2-(1'-methyl-4'-acetoxy-4'-piperidyl)-cyclopentanone, citrate M.P. 158°;
2-(1'-methyl-4'-acetoxy-4'-piperidyl)-6-methyl-cyclohexanone;
2-(1'-methyl-4'-acetoxy-4'-piperidyl)-3-pentanone, citrate M.P. 182–184°;
1-(1',3'-dimethyl-4'-acetoxy-4'-piperidyl)-2-propanone, citrate M.P. 127–129°.

Example 2

If, in the process of Example 1(b), 13 g. of propionic acid anhydride are used instead of the acetanhydride and the reaction mixture is stirred for 1½ to 2 hours, then the citrate of 1-(1'-methyl-4'-propionoxy-4'-piperidyl)-2-propanone is obtained, M.P. 129–130°.

The following compounds are produced in an analogous manner:

1-(1'-methyl-4'-propionoxy-4'-piperidyl)-2-butanone, citrate M.P. 162°;
1-(1'-methyl-4'-propionoxy-4'-piperidyl)-2-pentanone, citrate M.P. 156°;
1-(1'-methyl-4'-propionoxy-4'-piperidyl)-3-methyl-2-butanone, citrate M.P. 146–148°;
2-(1'-methyl-4'-propionoxy-4'-piperidyl)-cyclohexanone, citrate M.P. 150–152°;
2-(1'-methyl-4'-propionoxy-4'-piperidyl)-cyclopentanone, citrate M.P. 146°;
2-(1'-methyl-4'-propionoxy-4'-piperidyl)-3-pentanone, citrate M.P. 162–163°.

Example 3

(a) 10 g. of mercury are added to 4.05 g. of coarse aluminium turnings and well mixed with a stirrer. Unused mercury is then decanted off. The amalgamated aluminium in 25 ml. of abs. tetrahydrofuran and 15 ml. of abs. benzene is then boiled for a short time with 15 mg. of mercury chloride and the whole is then stirred for 15 minutes. Of a total amount of 20.5 ml. of propargyl bromide, so much is added, without solvent, at 50–60° to start the reaction and to make the temperature rise towards 70°; afterwards the remaining propargyl bromide, diluted with 35 ml. of abs. benzene is added. The mixture is stirred for 30 minutes. 50 g. of 1-(β-phenylethyl)-4-piperidone in 150 ml. of abs. benzene are then added slowly dropwise at 20–25° while cooling with ice and the mixture is stirred for another 15 hours. It is then decomposed with ice and hydrochloric acid, the aqueous phase is separated, washed with chloroform and made alkaline with concentrated sodium hydroxide solution and the base liberated is taken up in chloroform. The chloroform solution is dried and concentrated and the residue is distilled whereupon 1-(β-phenylethyl)-4-(2'-propinyl)-4-piperidinol is obtained, B.P.$_{0.03}$ 130–140°.

The following compounds, for example are obtained in an analogous manner:

1-benzyl-4-(2'-propinyl)-4-piperidinol, B.P.$_{0.03}$ 128–135°;
1-methyl-4-(1'-methyl-2'-propinyl)-4-piperidinol, B.P.$_{0.01}$ 75–78°;
1-ethyl-4-(2'-propinyl)-4-piperidinol,
1-n-butyl-4-(2'-propinyl)-4-piperidinol,
1-n-hexyl-4-(2'-propinyl)-4-piperidinol,
1-(γ-phenylpropyl)-4-(2'-propinyl)-4-piperidinol,
1-cyclopropylmethyl-4-(2'-propinyl)-4-piperidinol,
1-allyl-4-(2'-propinyl)-4-piperidinol, and
1-dodecyl-4-(2'-propinyl)-4-piperidinol.

(b) 5.3 g. of 1-(β-phenylethyl)-4-(2'-propinyl)-4-piperidinol, 21 ml. of 10% sulphuric acid and 300 mg. of mercury sulphate are stirred for 5 hours at 60°. The mixture is then made alkaline with concentrated sodium hydroxide solution and extracted with chloroform. The chloroform solution is washed with saturated sodium chloride solution, dried and concentrated. Distillation of the residue yields 1 - [1' - (β-phenylethyl)-4'-hydroxy-4'-piperidyl]-2-propanone which boils at 135–140° under 0.01 mm. pressure.

The hydrochloride precipitated from a solution of the base in isopropanol/ether with ethereal hydrogen chloride solution melts, after recrystallisation from isopropanol, at 127–129°.

The following compounds, for example, are obtained in an analogous manner:

1-(1'-benzyl-4'-hydroxy-4'-piperidyl)-2-propanone, B.P.$_{0.01}$ 130–135°, hydrochloride M.P. 166–168°;
3-(1'-methyl-4'-hydroxy-4'-piperidyl)-2-butanone, B.P.$_{0.01}$ 78–80°;
1-(1'-ethyl-4'-hydroxy-4'-piperidyl)-2-propanone,
1-(1'-n-butyl-4'-hydroxy-4'-piperidyl)-2-propanone,
1-(1'-n-hexyl-4'-hydroxy-4'-piperidyl)-2-propanone,
1-[1'-(γ-phenylpropyl)-4'-hydroxy-4-piperidyl]-2-propanone,
1-(1'-cyclopropylmethyl-4'-hydroxy-4'-piperidyl)-2-propanone,
1-(1'-allyl-4'-hydroxy-4'-piperidyl)-2-propanone, and
1-(1'-dodecyl-4'-hydroxy-4'-piperidyl)-2-propanone.

(c) On treating the above hydroxy compounds with acetanhydride or propionic acid anhydride analogously to Examples 1(b) and 2, the following esters, for example, are obtained:

1[1'-(β-phenylethyl)-4'-acetoxy-4'-piperidyl]-2-propanone,
1-[1'-(β-phenylethyl)-4'-propionoxy-4'-piperidyl]-2-propanone,
1-(1'-benzyl-4'-acetoxy-4'-piperidyl)-2-propanone,
1-(1'-benzyl-4'-propionoxy-4'-piperidyl)-2-propanone,
3-(1'-methyl-4'-acetoxy-4'-piperidyl)-2-butanone,
3-(1'-methyl-4'-propionoxy-4'-piperidyl)-2-butanone,
1-(1'-ethyl-4'-acetoxy-4'-piperidyl)-2-propanone,
1-(1'-ethyl-4'-propionoxy-4'-piperidyl)-2-propanone,
1-(1'-n-butyl-4'-acetoxy-4'-piperidyl)-2-propanone,
1-(1'-n-butyl-4'-propionoxy-4'-piperidyl)-2-propanone,
1-(1'-n-hexyl-4'-acetoxy-4'-piperidyl)-2-propanone,
1-(1'-n-hexyl-4'-propionoxy-4'-piperidyl)-2-propanone,
1-[1'-(γ-phenylpropyl)-4'-acetoxy-4'-piperidyl]-2-propanone,
1-[1'-(γ-phenylpropyl)-4'-propionoxy-4'-piperidyl]-2-propanone,
1-(1'-cyclopropylmethyl-4'-acetoxy-4'-piperidyl)-2-propanone,
1-(1'-cyclopropylmethyl-4'-propionoxy-4'-piperidyl)-2-propanone,
1-(1'-allyl-4'-acetoxy-4'-piperidyl)-2-propanone,
1-(1'-allyl-4'-propionoxy-4'-piperidyl)-2-propanone,
1-(1'-dodecyl-4'-acetoxy-4'-piperidyl)-2-propanone, and
1-(1'-dodecyl-4'-propionoxy-4'-piperidyl)-2-propanone.

Example 4.—1-(1'-methyl-4'-acetoxy-4'-piperidyl)-2-butanone 2.1 g. of acetyl chloride are slowly poured, while cooling well, into 5 ml. of pyridine, the crystallising precipitate formed is crushed with a glass rod and then the 1 - (1' - methyl-4'-hydroxy-4'-piperidyl)-2-butanone dissolved in 5 ml. of pyridine is added in portions while cooling. The mixture is then stirred for 1½ hours at room temperature (e.g. with a magnetic stirrer) whereupon it becomes dark coloured and the precipitate disappears. The pyridine is then evaporated off in a rotary evaporator at 20° under high vacuum, ice is added to the residue, the reaction is made alkaline with concentrated sodium hydroxide solution and it is extracted with chloroform. The chloroform solution is dried and concentrated. The residue is dissolved in acetone and the citrate of the base is precipitated by the addition of a solution of citric acid in acetone and filtered off. After recrystallisation from methanol/acetone, the citrate of 1-(1'-methyl-4'-acetoxy-4'-piperidyl) - 2 - butanone melts at 139°, cf. of Example 1(b).

To produce dosage units for peroral application containing a compound of one of the Formulas I, or I**, or a pharmaceutically acceptable addition salt thereof as active substance, the latter is combined, for example, with solid, pulverulent carriers such as lactose, saccharose, sorbitol, mannite; starches such as potato starch, corn starch or amylopectin, also laminaria powder or citrus pulp powder; cellulose derivatives or gelatine, also lubricants such as magnesium or calcium stearate or polyethylene glycols of waxy consistency (Carbowaxes) may be added to form tablets or dragée centers. The latter are coated, for example, with concentrated sugar solutions which, e.g. can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other closed capsules consist, for example, of a mixture of gelatine and glycerine, and contain, e.g., mixtures of the active substance with Carbowax, and hard gelatine capsules contain, for example, granulates of the active substance with solid, pulverulent carriers such as, for example, lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance with a neutral fatty base, or also gelatine rectal capsules can be employed which consist of a combination of the active substance with polyethylene glycols of waxy consistency (Carbowaxes).

Syrups or suspensions for peroral application consist, for example, of a solution containing at least about 2% and at most about 20% by weight of active substance, sugar and a mixture of ethanol, water and glycerin as well as propyleneglycol and, for example, aroma, saccharine and/or carboxymethylcellulose (for suspension purpose).

Ampoules for parenteral application by injection advantageously contain a water soluble pharmaceutically acceptable salt of the active substance according to the invention in a concentration of advantageously 0.5–10%, optionally together with suitable stabilising agents and/or buffer substances in aqueous solution.

The following non-limitative examples illustrate the production of typical forms of application of compounds according to the invention.

Example I

Manufacturing instructions for the production of a syrup containing 5% (weight per volume) of active substance of Formulas I and I**

| | | |
|---|---|---|
| Active substance | g | 5.0 |
| Saccharine | g | 0.6 |
| Sugar | g | 3.0 |
| Glycerin | g | 5.0 |
| Distilled water | g | 10.0 |
| Aroma | g | 0.1 |
| Ethanol 96% | ml | ad 100.0 |

Sugar and saccharine are dissolved in hot distilled water. On cooling, the solution is made up to weight with water and glycerin is added. The aqueous solution is poured into the solution of active substance and aroma in about 65 ml. of ethanol and then made up to 100 ml. with ethanol.

As active substance for an antitussive syrup can be used, for example 2-(1'-methyl-4'-hydroxy-4'-piperidyl)-3-pentanone, 1 - (1' - methyl-4'-hydroxy-4'-piperidyl)-3-methyl-2-butanone, α - (1' - methyl - 1', 2',3',6' - tetrahydro - 4' - pyridyl)-acetophenone, 1-(methyl-1',2',3',6'-tetrahydro - 4' - pyridyl) - 3 - methyl - 2 - butanone, 1 - (1' - methyl - 4 - acetoxy - 4' - piperidyl)-2-pentanone and 1 - (1' - methyl - 4 - acetoxy - 4' - piperidyl)-2-butanone or one of their pharmaceutically acceptable acid addition salts.

Example II 250 g. of active substance are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. The tablets can be marked with break lines if desired to enable a closer adaptation of the dosage to be made. As active substance can be used 2-(1'-methyl-1',2',3',6' - tetrahydro - 4' - pyridyl) - 3 - pentanone or 1 - (1' - methyl - 4' - propionoxy - 4' - piperidyl) - 2-butanone. This gives analgesic tablets.

On using 1 - (1' - methyl-4'-acetoxy-4'-piperidyl)-2-pentanone or 2-(1'-methyl-4'-hydroxy-4'-piperidyl)-3-pentanone antitussive tablets are obtained.

Example III

A granulate is prepared from 250 g. of active substance, 175.90 g. of lactose and the alcoholic solution of 10 g. of stearic acid. After drying, the granulate is mixed with 56.60 g. of colloidal silicium dioxide, 165 g. of talcum. 20 g. of potato starch and 2.50 g. of magnesium stearate and pressed into 10,000 dragée centers. These are first coated with 6 g. of shellac, then with a concentrated syrup of 502.28 g. of crystallized saccharose, 10 g. of gum arabic, 0.22 g. of dyestuff of 1.5 g. of titanium dioxide, and dried. The dragées obtained each weigh 120 mg. and contain 25 mg. of 1'-(1'-ethyl-4'-propionoxy-4'-piperidyl)-2-butanone or 3-(1'-methyl-1',2', 3', 6'-tetrahydro-4'-pyridyl)-2-butanone. These dragées can serve as analgesics.

In a similar manner on using 1-(1'-methyl-4'-acetoxy-4'-piperidyl)-2-pentanone as active substance, antitussive dragées are obtained.

Example IV 1.0 g. of 1-(1'-methyl-1',2',3',6'-tetrahydro-4'-pyridyl)-2-butanone-citrate and 0.10 g. of ascorbic acid, are dissolved in distilled water up to 100 ml. This solution is used to fill ampoules, each e.g. of 1 ml. which corresponds to a content of 10 mg. of active substance, which are sterilized by heating in the usual way.

We claim:
1. A member selected from the group consisting of a ketone of the formula

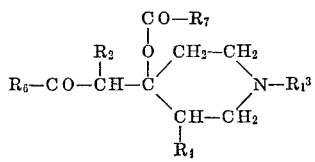

wherein
$R_1^3$ is a member selected from the group consisting of alkyl of at most 12 carbon atoms, alkenyl of 3 to 4 carbon atoms, cyclopropylmethyl, and phenylalkyl of 7 to 9 carbon atoms,
$R_2$ and $R_4$ are each a member selected from the group consisting of hydrogen and methyl,
$R_6$ is alkyl of at most 4 carbon atoms,
$R_2$ and $R_6$ taken together represent a member selected from the group consisting of trimethylene, tetramethylene and 1-methyl-tetramethylene, and
$R_7$—CO— represents an alkanoyl radical having at most 5 carbon atoms,
and a pharmaceutically acceptable acid addition salt thereof.

2. A compound as defined in claim 1, wherein $R_1^3$ and $R_6$ are each methyl, $R_2$ and $R_4$ are each hydrogen, and $R_7$ is ethyl.

3. A compound as defined in claim 1, wherein $R_1^3$ is methyl, $R_2$ and $R_4$ are each hydrogen, and $R_6$ and $R_7$ are each ethyl.

4. A compound as defined in claim 1, wherein $R_1^3$ is methyl, $R_4$ is hydrogen, $R_7$ is ethyl, and $R_2$ and $R_6$ together are tetramethylene.

5. A compound as defined in claim 1, wherein $R_1^3$ and $R_7$ are each methyl, $R_4$ is hydrogen, and $R_2$ and $R_6$ together are tetramethylene.

6. A compound as defined in claim 1, wherein $R_1^3$ and $R_7$ are each methyl, $R_2$ and $R_4$ are each hydrogen, and $R_6$ is propyl.

7. A compound as defined in claim 1, wherein $R_1^3$ and $R_7$ are each methyl, $R_2$ and $R_4$ are each hydrogen, and $R_6$ is ethyl.

References Cited
UNITED STATES PATENTS 3,125,574 3/1964 Janssen _____ 260—294.75
3,029,244 4/1962 Lyle et al. _____ 260—294.75

HENRY R. JILES, *Primary Examiner.*

A. D. SPEVACK, *Assistant Examiner.*